Patented Nov. 28, 1950

2,532,253

UNITED STATES PATENT OFFICE 2,532,253

SEPARATION OF PENTAERYTHRITOL AND FORMIC ACID

Joseph A. Wyler, Allentown, Pa., assignor to Trojan Powder Company, a corporation of New York No Drawing. Application July 13, 1949, Serial No. 104,585

3 Claims. (Cl. 260—637)

This invention relates to a process for crystallizing pentaerythritol from aqueous solution and the recovery of pentaerythritol and formic acid from aqueous solutions containing both of these materials and also polyhydroxy by-products of the manufacture of pentaerythritol.

A well known process for the commercial production of pentaerythritol is based upon the condensation of one molecule of acetaldehyde with four molecules of formaldehyde in an aqueous medium kept alkaline by means of an excess of calcium oxide. In this process, one half molecule of calcium formate is formed for each molecule of pentaerythritol. The calcium ion is removed from the resulting solution by adding sulfuric and oxalic acids followed by filtration. The filtrate thus obtained will usually contain about 3 parts of formic acid for 9 to 10 parts of pentaerythritols (pentaerythritol and related polyhydroxy materials formed as by-products).

To produce crystals of pentaerythritol, it is customary to evaporate this filtrate, crystallize out pentaerythritol, re-evaporate the mother liquor, and repeat the cycle of operations until there results a mother liquor that cannot well be separated from the crystals of pentaerythritol. This final mother liquor contains a large proportion of the said related polyhydroxy compounds. They are soluble in water and form a viscous syrupy solution. They contaminate the pentaerythritol crystals obtained, as shown by decrease in the hydroxy content and particularly the lower melting points of the later fractions of the crystals.

I have now discovered that it is possible to extract from the said filtrate these polyhydroxy compounds that normally interfere with the production of good quality crystals of pentaerythritol. I have also discovered that this extraction may be effected with tributyl phosphate as the extracting agent but only in case the filtrate or aqueous solution is in acid condition at the time of the extraction. When, on the other hand, the aqueous solution being extracted is alkaline, then the polyhydroxy compounds other than pentaerythritol are not extracted satisfactorily by the tributyl phosphate. Normally the acidity of the solution for extraction is established by formic acid. The tributyl phosphate extracts the formic acid also.

While the exact mechanism by which the formic acid or like acid improves the extractability of the polyhydroxy compounds is not known, it is considered that the association of the compounds with the acid possibly in the form of an incipient ester like material, so changes the distribution coefficient of the associated product, between water on the one hand and tributyl phosphate (also an ester) on the other hand, that the polyhydroxy compounds go by preference into the tributyl phosphate layer.

In brief, my process comprises thoroughly mixing tributyl phosphate with an aqueous pentaerythritol solution containing other polyhydroxy compounds of the kind described and free formic acid, so as to extract the formic acid and said compounds, allowing the mixture to separate into two layers; removing the top layer (tributyl phosphate, formic acid, and polyhydroxy compounds other than pentaerythritol), subjecting the lower aqueous layer to another extraction with tributyl phosphate, and repeating the extraction and separation steps, if necessary, until the formic acid and said compounds have been largely removed from the pentaerythritol solution. By this process, the formic acid and the hydroxy compounds other than pentaerythritol pass into the tributyl phosphate and the pentaerythritol remains in the aqueous layer from which it is readily obtained by evaporation, cooling, and crystallization.

The tributyl phosphate of commerce usually contains about 2% of water. In contact with the type of pentaerythritol solutions described above, the tributyl phosphate takes up about 4 to 6% additional water. The amount of pentaerythritol extracted by the tributyl phosphate, on the other hand, is negligible and the amount of tributyl phosphate passing into the aqueous pentaerythritol solution is also negligible for practical purposes.

The formic acid extracted by the tributyl phosphate is recovered by treating the tributyl phosphate solution containing the formic acid with an aqueous solution of sodium carbonate, an alkali that gives a soluble salt with formic acid. Examples of such alkalies that are used are sodium hydroxide, or potassium hydroxide in amount to neutralize the formic acid and to give a formate in water solution. The latter forms a separate aqueous layer and is readily separated from the tributyl phosphate layer which is now essentially free from formic acid.

The formate is recovered by any conventional process for recovery of the formate from a water solution and formic acid is liberated by treatment of the formate with hydrous sulfuric acid.

In order more clearly to point out my invention, the following example, in which all parts are by weight, is given for illustration.

*Example 1*

250 parts of pentaerythritol liquor (filtrate from the precipitated calcium) of the kind described and containing 3.82% of formic acid were added to 250 parts of tributyl phosphate containing 1.65% of water. The mixture was agitated vigorously for a few minutes. The mixture was then allowed to stand for about five minutes and the two resulting layers separated and weighed.

The tributyl phosphate or upper layer weighed 274.5 parts and was found to contain 2.5% of formic acid, 6.1% of water, and 0.9 part of organic matter including polyhydroxy compounds.

The water layer weighed 225.5 parts and was found upon evaporation of a sample to contain 21.6 parts of solids (pentaerythritol and the like) and 1.27% of formic acid.

The 225.5 parts of aqueous layer were again extracted with 225.5 parts of the tributyl phosphate.

The second tributyl phosphate layer weighed 244.5 parts. It contained 0.84% of formic acid, 6.3% of water, and 1.5 parts of organic matter including polyhydroxy compounds.

The second water layer weighed 206.5 parts and was found to contain 0.44% of formic acid and 20.0 parts of solids of hydroxyl content 44.12%. More nearly complete removal of the formic acid and polyhydroxy compounds other than pentaerythritol is not necessary to obtain a satisfactory pentaerythritol recovery by evaporation and cooling to cause crystallization from the extracted solution.

The first tributyl phosphate layer was treated with a 13.7% solution of sodium hydroxide to neutralize the free formic acid contained therein and to recover the formic acid as sodium formate. The formate entered the aqueous layer.

The second tributyl phosphate layer was used as the extracting material with an original pentaerythritol liquor containing the higher concentrations of formic acid, so as to economize on the amount of fresh tributyl phosphate needed in the process.

*Example 2*

A pentaerythritol-containing liquor of the kind used in Example 1 was used. This is the filtrate remaining after removal of the calcium precipitate formed by adding first sulfuric acid and then oxalic acid to the formaldehyde and acetaldehyde condensation liquor. This liquor was divided into two portions.

One portion of the liquor was evaporated to dryness to make a residue of pentaerythritols, including pentaerythritol itself and the di- and tripentaerythritols, in addition to the polyhydroxy compounds of kind described above. This residue had a hydroxy content of 43.5%. When it is considered that pentaerythritol has a theoretical hydroxy content of approximately 50%, dipenta 40.1%, and tripenta 36.5%, and the so-called mother liquor polyhydroxy compounds usually about 26%, it will be appreciated that a large proportion of the impurities are required to lower substantially the hydroxy content of the whole residue.

The second portion of the liquor was subjected to three extractions with tributyl phosphate as described above and the aqueous layer remaining after the last extraction was then evaporated to dryness. In this instance there was obtained a residue of hydroxy content 45.3%. The increase of 1.8% in the overall hydroxy content shows a large decrease in the proportion of the polyhydroxy impurities and, necessarily extraction of them in large measure by the tributyl phosphate.

Many modifications of this general process may be made. Thus the proportion of tributyl phosphate to liquor being extracted may be varied. The number of successive extractions also may be varied. The order of the use of the successive extracting portions upon the original liquors may be altered as occasion warrants and the temperature at which the extraction is performed may be made any one suitable for convenient handling of the liquors. The extraction process may be made continuous.

It will be understood also that it is intended to cover all changes and modifications of the examples of the invention herein chosen for the purpose of illustration which do not constitute departures from the spirit and scope of the invention.

What I claim is:

1. In crystallizing pentaerythritol from an aqueous solution of pentaerythritol, formic acid and polyhydroxy compounds other than pentaerythritol, the method which comprises maintaining the said solution in acid condition, mixing tributyl phosphate therewith, causing the mixture so made to stand, this resulting in the separation of tributyl phosphate and material extracted thereby as an upper layer above a remaining heavier aqueous solution of pentaerythritol, separating the upper layer from the heavier aqueous solution, evaporating the said heavier solution to concentrated form, and subsequently cooling the thus concentrated solution, to cause crystallization of pentaerythritol.

2. The method described in claim 1 which includes mixing the separated upper layer of tributyl phosphate and materials extracted thereby with an aqueous solution of an alkali compound of a metal the formate of which is soluble, this mixing causing neutralization of formic acid and separation of the said water soluble formate in an aqueous layer distinct from the tributyl phosphate, and then separating the aqueous formate layer from the tributyl phosphate layer.

3. In separating pentaerythritol and formic acid from an aqueous solution containing them, the method which comprises maintaining the solution in acid condition, mixing tributyl phosphate therewith, causing the resulting mixture to stand, this resulting in the separation of tributyl phosphate and formic acid extracted thereby as an upper layer above a remaining heavier aqueous solution of pentaerythritol, separating the upper layer from the heavier solution, evaporating the heavier solution of pentaerythritol to concentrated form, and subsequently cooling the concentrated solution, to cause crystallization of the pentaerythritol.

JOSEPH A. WYLER.

REFERENCES CITED

The following references are of record in the file of this patent:

UNITED STATES PATENTS

| Number | Name | Date |
|---|---|---|
| 1,716,110 | Burke | June 4, 1929 |
| 1,993,259 | Buc | Mar. 5, 1935 |
| 2,360,186 | Wyler | Oct. 10, 1944 |
| 2,441,602 | Snow | May 18, 1948 |
| 2,464,167 | Wyler | Mar. 8, 1949 |

OTHER REFERENCES

"The Condensed Chemical Dictionary," third ed., page 642. Pub. by Reinhold Publishing Corp., New York, 1942.